United States Patent [19]

Holz

[11] Patent Number: 4,571,298
[45] Date of Patent: Feb. 18, 1986

[54] SORTING SCREEN

[75] Inventor: Emil Holz, Eningen, Fed. Rep. of Germany

[73] Assignee: Hermann Finckh Maschinenfabrik GmbH & Co., Reutlingen, Fed. Rep. of Germany

[21] Appl. No.: 656,439

[22] Filed: Oct. 1, 1984

[30] Foreign Application Priority Data

Oct. 11, 1983 [DE] Fed. Rep. of Germany ....... 3336874

[51] Int. Cl.$^4$ ...................... B01D 29/04; B01D 29/20
[52] U.S. Cl. .................................... 210/498; 210/415; 428/596; 428/131
[58] Field of Search ................ 428/596, 131; 210/498; 209/397

[56] References Cited

U.S. PATENT DOCUMENTS

| 206,632 | 7/1978 | Snell | 210/498 |
| 298,172 | 5/1884 | Cave | 210/498 |
| 1,780,882 | 11/1930 | Kettler . | |
| 2,419,155 | 4/1947 | Orton . | |
| 3,581,903 | 6/1971 | Holz | 210/498 |
| 4,276,159 | 6/1981 | Lehman . | |
| 4,309,284 | 1/1982 | Morimoto et al. . | |
| 4,358,370 | 11/1982 | Jameson et al. | 210/498 X |
| 4,415,613 | 11/1983 | Medney . | |

FOREIGN PATENT DOCUMENTS

| 1611145 | 9/1970 | Fed. Rep. of Germany . |
| 443247 | 9/1912 | France . |
| 2516563 | 5/1983 | France . |

Primary Examiner—Alexander S. Thomas
Attorney, Agent, or Firm—Leydig, Voit & Mayer, Ltd.

[57] ABSTRACT

Sorting screen for fibre suspensions comprising a screen wall having recesses on a first side and narrower sorting apertures on the other, second side, these apertures opening into the recesses and the recesses each extending over a plurality of sorting apertures and being spaced in all directions from one another such that the screen wall has a net structure on its first side between the apertures. In order to achieve the utmost fineness when sorting with such a screen the recesses are arranged on the inflow side of the screen wall and the sorting apertures are designed as bores.

7 Claims, 7 Drawing Figures

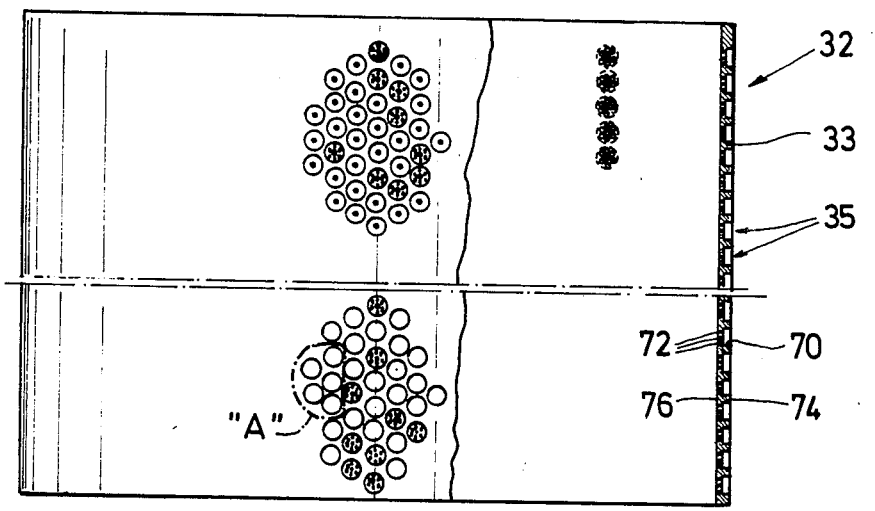
Fig. 2
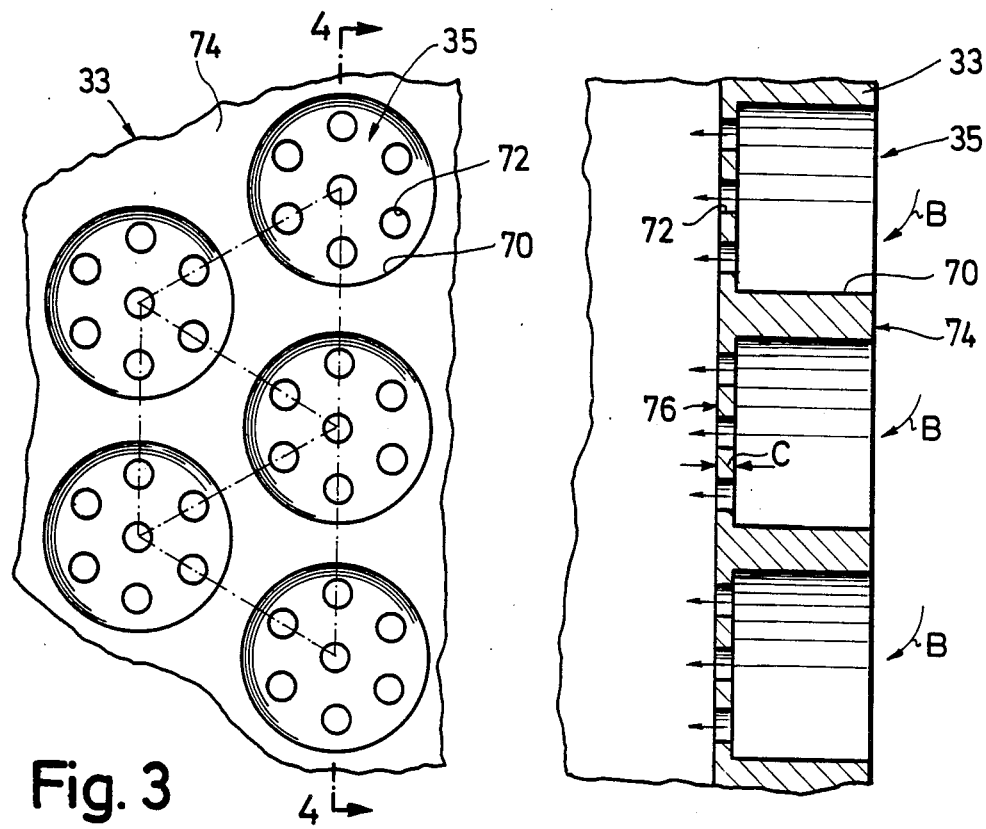
Fig. 3
Fig. 4

SORTING SCREEN

The invention relates to a sorting screen for fibre suspensions comprising a screen wall having recesses on a first side and narrower sorting apertures on the other, second side, these apertures opening into the recesses and the recesses each extending over a plurality of sorting apertures and being spaced in all directions from one another such that the screen wall has a net structure on its first side between the recesses.

It is known to provide sorting screens (vide, for example, U.S. Pat. No. 3,581,903) with apertures in their side walls, these apertures widening in a direction perpendicular to the side walls.

A sorting screen of the type described above has already been proposed by the applicant. This screen has the shape of an essentially circular-cylindrical screen cage for a pressure sorter. This screen cage has on its outer or inflow side a plurality of fine, self-contained grooves extending in the circumferential direction, the bases of which open, in the form of fine slots extending parallel to one another, into circular-cylindrical recesses. These recesses are milled into the screen wall from the inner side of the screen cage and their centres—seen in the plan view onto the screen wall when laid flat—form the corners of equilateral triangles. The fine sorter apertures of this known screen cage are located on its inflow side and have the shape of slots. The recesses are located on the outflow side of the sorting screen (vide also applicant's European patent application No. 82103801.5). This design for a sorting screen was proposed for the following reasons. The energy to be expended in a pressure sorter is to be kept as low as possible. Therefore, the flow resistance of a sorting screen to the fibre suspension to be screened should also be kept as low as possible. For this reason, the aim is to have a screen wall which is as thin as possible since flow resistance increases with the length of the channels formed by the screen wall apertures and this length corresponds to the wall thickness. Limits are, however, set as to how much the thickness of the sorting screen wall in sorting machines such as pressure sorters, vibrating sorters and so-called Jonsson screens and the like may be reduced because the sorting screen would not otherwise withstand the loads occurring during operation of the sorting machine. The flow resistance of applicant's above proposal is much less than that of a conventional sorting screen having the same wall thickness and through slots as sorter apertures even though the resistance to pressure and rupture of both sorting screens is approximately of the same magnitude.

In the sorting screen already proposed by the applicant, the recesses designed as circular-cylindrical cavities are located on the outflow side of the screen wall. Therefore, they merely serve the purpose of reducing the length of the channels formed by the narrower, slot-like sorting apertures, this length being measured vertically to the screen wall, but retaining to a great extent the rigidity and stability of the sorting screen. The object of the present invention was therefore to improve this known sorting screen still further, above all with a view to the fineness of the screened fibre suspension, i.e. the quality of that part of the fibre suspension accumulating on the outflow side of the screen wall. Proceeding on the basis of a sorting screen of the type described at the outset, the object of the invention may be accomplished in that the recesses are arranged on the inflow side of the screen wall and the sorting apertures are designed as bores. Such a design for a sorting screen has a great number of advantages, as will become evident in the following. In addition, attention may be drawn to the fact that boring of the fine sorting apertures of the inventive sorting screen requires a great deal less machining than the milling of the circular, annular grooves of the known sorting screen described in the aforesaid, quite apart from the fact that the screen is weakened to a greater degree by the grooves than by bores. The inventive sorting screen also has the advantage, of course, that flow resistance at a given fineness of the screened fibre suspension is essentially determined by the length of the channels formed by the bores, this length being considerably less than the wall thickness of the sorting screen, while the resistance to pressure and rupture of the inventive sorting screen is considerably better than that of a sorting screen whose wall thickness corresponds to the channel length referred to. When the thickness of the screen wall is the same, the invention also allows the free through surface (sum total of the inside cross sections of the screen apertures) to be considerably larger than in conventional sorting screens having simple, through apertures or apertures widening in the direction of flow.

The embodiments of the inventive sorting screen which have proven to be particularly advantageous are those with which the thickness of the screen wall remaining at the base of the recesses is at the most equal to the diameter of the sorting apertures.

Further advantages result when the sorting apertures are cylindrical and countersunk at their ends remote from the recesses or when the sorting apertures are conical. This will further reduce flow resistance without diminishing the fineness of the screened fibre suspension. When the sorting apertures widen in the direction of flow due to their countersunk or conical design and pressure pulses are generated on the outflow side of the sorting screen, e.g. in the case of a pressure sorter having a rotor rotating inside or outside a screen cage, the sorting apertures will be subject to reverse flushing which will effectively prevent the apertures from becoming clogged.

In most of the sorting machines, the flow of fibre suspension has a component oriented parallel to the screen wall on the inflow side of the sorting screen. This results either from a corresponding orientation of the inflow opening for the fibre suspension into the sorting machine or from a rotor rotating on the inflow side of a screen cage. In this case, the inventive sorting screen has a double sorting effect, namely preliminary sorting by the large screen apertures formed by the recesses and fine sorting when the fibre suspension flows through the fine sorting apertures designed as bores. With the pressure sorters in question, it is however recommended, for energy reasons, that the rotor should rotate on the side of the screen wall opposite the recesses, i.e. on its ouflow side. The reverse flushing pulses described above and generated by the rotor are then closer to the fine sorting apertures designed as bores and do not have to pass first of all through the recesses, even though they are intended to generate their effect only at the fine sorting apertures. When the reverse flushing pulses are of a predetermined strength, less drive energy is required for the rotor. In principle, it is also conceivable to provide the rotor with cleaning blades in the known way on both sides of a screen cage formed by the sorting screen.

In sorting screens, in which the fibre suspension does not impinge vertically on their inflow sides but where the flow is, as customary, flat against the sorting screens, the recesses have a particularly positive effect. They disturb the flow such that the fibres in the fibre suspension cannot form a compact fleece moving along the screen wall. Such a fleece has the effect of a filter and reduces in an undesired manner the proportion of long fibres in the usable fibre suspension passing through the sorting screen.

When the inventive sorting screen has, in the plan view, elongated, for example rectangular or oval recesses and the flow is flat against the sorting screen, it is appropriate for the recesses to be oriented transversely to the direction of flow.

Additional features, advantages and details of the invention are given in the attached claims and/or the following description and the attached drawings of several preferred embodiments of the inventive sorting screen. In the drawings, FIG. 1 is an axial section through a pressure sorter for an inventive sorting screen;

FIG. 2 shows the screen cage of this pressure sorter in the side view but without illustrating all the recesses and sorting apertures;

FIG. 3 shows the section "A" of FIG. 2 on a larger scale;

FIG. 4 shows a section along the line 4—4 in FIG. 3;

Figure 1:
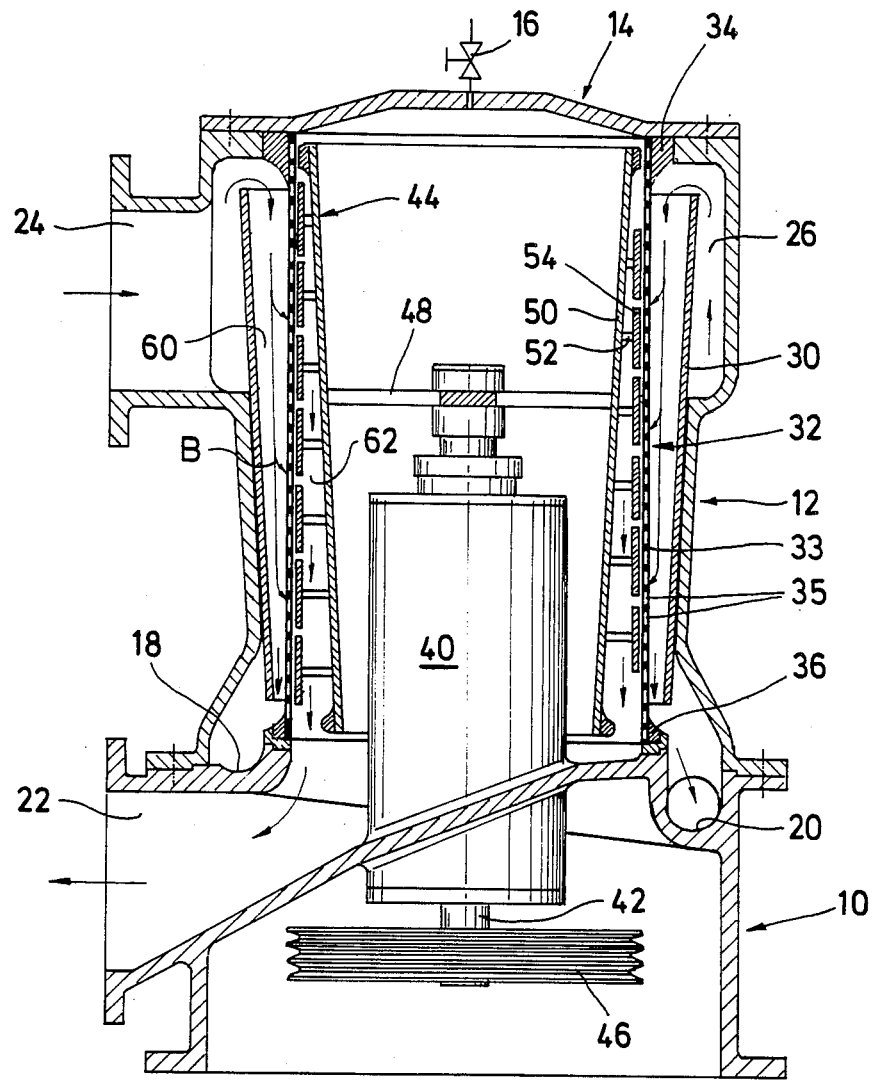

FIG. 1 shows a pressure sorter housing comprising a lower housing part 10, an upper housing part 12 and a cover 14, the highest point of which is provided with a ventilation valve 16. The lower housing part 10 forms a so-called rejected material channel 18 which extends around the upper side of the lower housing part and opens into a rejected material outlet 20. Furthermore, the lower housing part is provided with an accepted material outlet 22.

The upper housing part 12 has an inlet 24 for the fibre suspension to be sorted or separated, this inlet opening into an annular inlet chamber 26. An interchangeable cone 30 is inserted into the upper housing part 12. This cone tapers downwardly and extends upwardly as far as into the upper region of the annular inlet chamber 26. It encloses a cylindrical screen cage 32 held stationary in the upper housing part 12. The upper and lower edges of this screen cage are fixed to rings 34 and 36, respectively, which are secured to the housing. The screen cage is formed by a screen wall 33 which is closed to form a circular cylinder and has screen wall apertures designated as a whole as 35.

The lower housing part 10 supports a bearing body 40 for a shaft 42 of a rotor designated as a whole as 44. A belt pulley 46 for driving the rotor is attached to the lower end of the shaft 42. The upper end of the shaft 42 supports a conical casing 50 of the rotor via a set of arms 48. A plurality of small cleaning blades 54 are attached to the outside of the casing by means of short stems 52. The set of arms could, however, support a plurality of cleaning blades which extend over the entire height of the screen cage 32 and have an airfoil-type profile. As known per se, the cleaning blades 54 are designed and arranged such that a positive pressure pulse is generated on the leading side of the cleaning blade, relative to the direction of rotation, and a negative pressure pulse on the trailing blade edge in the gap between a cleaning blade and the screen cage. The reverse flushing and flushing effects thereby created in the screen wall apertures 35 are intended to prevent any clogging of these screen wall apertures.

It is advantageous for the inflow chamber 60 formed by the cone 30 and the screen cage 32 to taper from top to bottom whereas an annular space 62 formed between the screen cage 32 and the rotor casing 50 widens from top to bottom. The lower end of the inflow chamber opens into the rejected material channel 18 whereas the lower end of the annular space 62 opens into the accepted material outlet 22. Due to the described design of the inflow chamber 60, the flow velocity of the fibre suspension to be treated by the pressure sorter in the inflow chamber 60 has a relatively high vertical velocity component.

As shown clearly in FIGS. 2 to 4, the screen wall apertures 35 (vide FIG. 1) consist of circular-cylindrical recesses 70 and a plurality of sorting apertures 72. Each recess 70 is associated with a plurality of sorting apertures 72 designed as circular-cylindrical bores. The areas of the screen wall remaining between the recesses 70 in the inflow side 74 of the screen wall 33 form a net structure. As shown by FIGS. 2 to 4, in conjunction with FIG. 1, the rotor 44 of the illustrated, preferred embodiment of a pressure sorter rotates on the outflow side 76 of the screen wall 33. The above explanations concerning the inflow chamber 60 also show that the fibre suspension to be sorted flows to the screen wall 33 approximately in the direction of arrows B (vide FIG. 4). This results in particularly advantageous conditions. On the one hand, the rotor 44 generates pressure pulses in the direct vicinity of the sorting apertures 72 which are designed as narrow bores and are to be kept unclogged. On the other hand, the relatively large holes formed by the recesses 70 effect a preliminary sorting and prevent formation of a compact fibre fleece circulating on the inflow side 74 of the screen wall 33. This would have the effect of a detrimental filter, particularly for long fibres.

The rotor 44 could, however, rotate on the inflow side of the screen wall or, as known per se, have cleaning blades on both sides of the screen cage 32. The recesses 70 could also be arranged on the outflow side 76 and the sorting apertures 72 on the inflow side of the screen wall 33.

Figure 5:
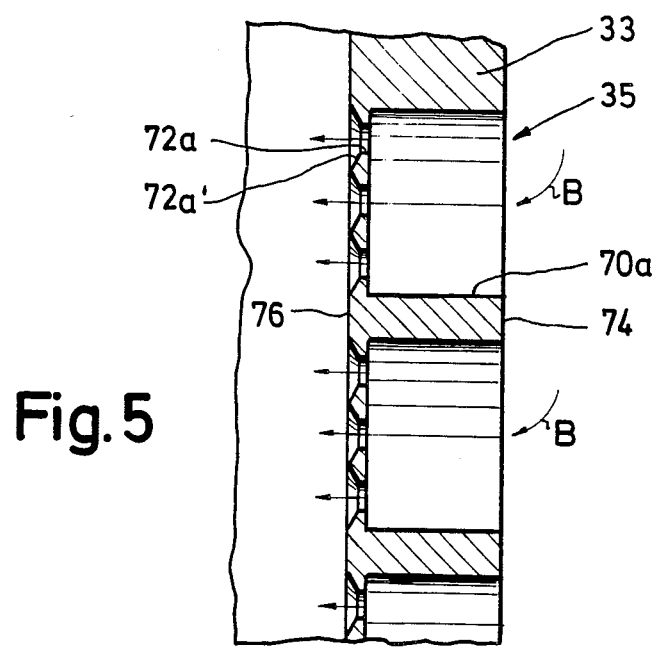
FIG. 5 is an illustration corresponding to FIG. 4 and showing a second embodiment.

The embodiment shown in FIG. 5 differs from that of FIG. 4 only in that the sorting apertures 72a, which are again designed as cylindrical bores, are each countersunk at 72a' on their side remote from the recesses 70a.

Figure 6:
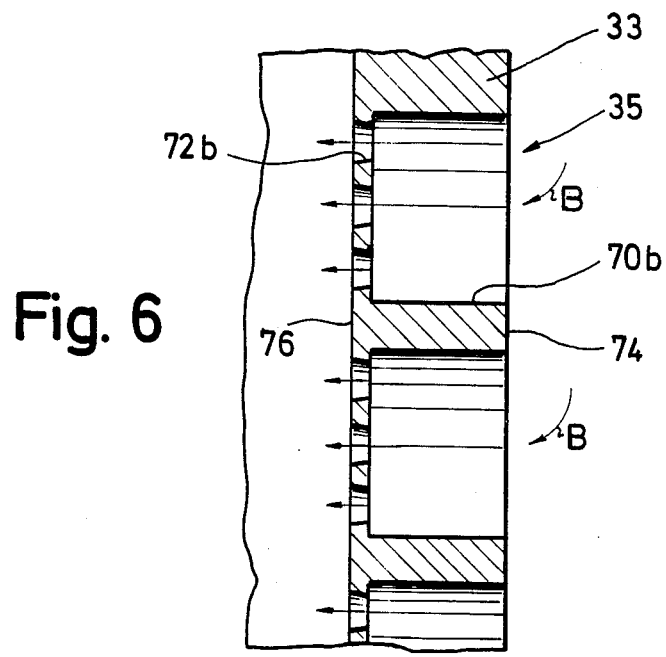
FIG. 6 is an illustration corresponding to FIG. 4 and showing a third embodiment of the inventive sorting screen and FIG. 7 is an axial section corresponding to FIG. 1 through a modified pressure sorter.

In the embodiment of FIG. 6, the sorting apertures 72b have the shape of conical bores tapering in the direction towards the recesses 70b; the sorting apertures 72b could also, however, widen towards the recesses 70b.

With a view to the aim of having low flow resistance, sorting screens are preferred, in which the thickness "C" (vide FIG. 4) of the screen wall 33 remaining at the base of the recesses 70 is, at the most, equal to the diameter of the sorting apertures 72. The same applies, of course, for the embodiments of FIGS. 5 and 6.

Figure 7:
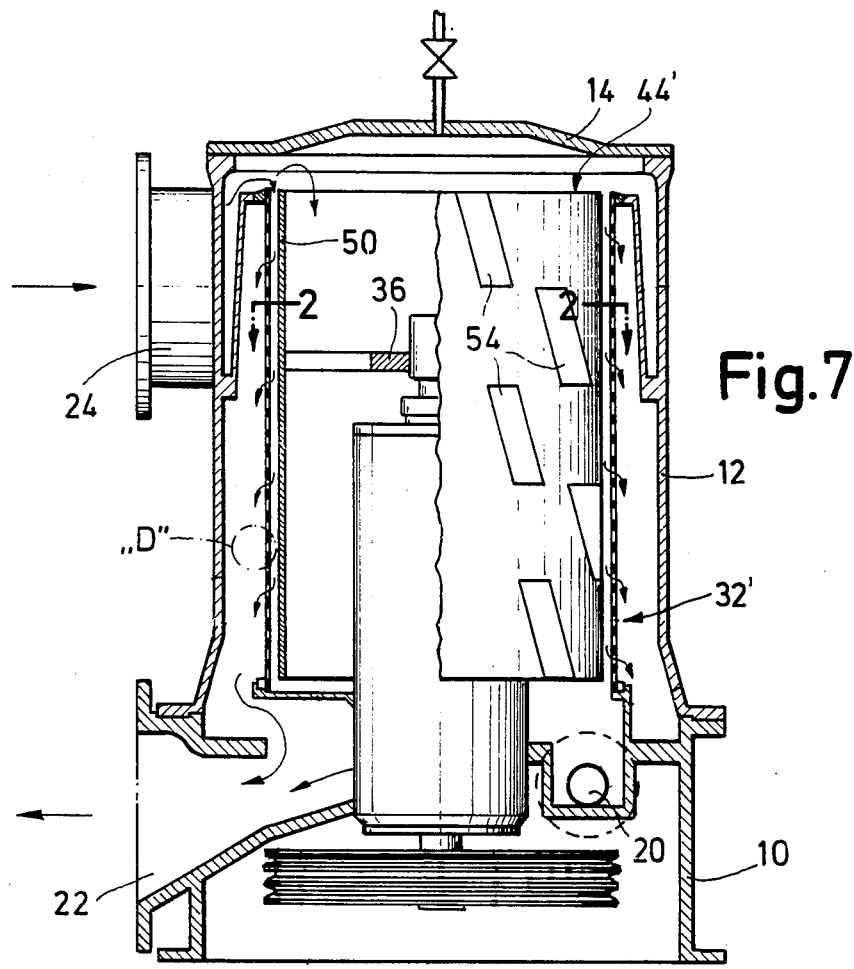

The pressure sorter shown in FIG. 7 differs from that of FIGS. 1 to 4 only in that the inflow side of the screen cage 32' and its recesses 70 are located on its inner side.

FIG. 4 is therefore intended to illustrate the section D of FIG. 7. The rotor of this pressure sorter has been designated 44'. The arrows show the flow of fibre suspension to be sorted as well as the accepted material and rejected material flows and no further description of the embodiment according to FIG. 7 is therefore necessary. The reference numerals 10, 12, 14, 22, 24, 30, 50 and 54 have the same significance as in FIG. 1. The recesses 70 of the pressure sorter shown in FIG. 7 are therefore arranged on the side of the screen cage facing the rotor 44'.

What is claimed is:

1. A pressure sorter for fibre suspensions comprising a screen wall which is closed to form an annular sorting screen basket having an inflow side and a flow-off side, said basket having cylindrically shaped recesses arranged on the inflow side of the screen wall and narrower sorting apertures on the flow-off side, said apertures opening into said recesses and said recesses each extending over a plurality of sorting apertures and being spaced in all directions from one another such that the screen wall has a net structure on said inflow side between said recesses, wherein said sorting apertures are designed as bores.

2. A pressure sorter as defined in claim 1, wherein the thickness of the screen wall remaining at the base of the recesses is at most equal to the diameter of the sorting apertures.

3. A pressure sorter as defined in claim 1, wherein the sorting apertures are cylindrical and countersunk at their ends remote from the recesses.

4. A pressure sorter as defined in claim 1, wherein the sorting apertures are conical.

5. A pressure sorter as defined in claim 1, wherein the sorting apertures widen in the direction of flow.

6. A pressure sorter as defined in claim 1 having a rotor rotating alongside the screen wall, wherein the recesses are arranged on the side of the screen wall remote from the rotor.

7. A pressure sorter as defined in claim 1 having a rotor rotating alongside the screen wall, wherein the recesses are arranged on the side of the screen wall facing the rotor.

* * * * *